United States Patent
Lee

(10) Patent No.: US 6,389,230 B1
(45) Date of Patent: May 14, 2002

(54) ZOOM CAMERA WITH FOCUSING ERROR CORRECTING FUNCTION AND CONTROL METHOD FOR THE SAME

(75) Inventor: Sang-Gi Lee, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 9 days.

(21) Appl. No.: 09/694,824

(22) Filed: Oct. 24, 2000

(30) Foreign Application Priority Data

Oct. 26, 1999 (KR) .............................................. 99-46674

(51) Int. Cl.$^7$ ................................................ G03B 13/36
(52) U.S. Cl. ............................................ 396/82; 396/87
(58) Field of Search .................................. 396/80, 81, 82, 396/79, 85, 87

(56) References Cited

U.S. PATENT DOCUMENTS

| | | | |
|---|---|---|---|
| 5,196,963 A | * 3/1993 | Sato et al. ................. | 396/79 X |
| 5,422,699 A | * 6/1995 | Sato et al. .................... | 396/82 |
| 5,943,513 A | * 8/1999 | Kim ............................ | 396/82 |

* cited by examiner

*Primary Examiner*—W. B. Perkey
(74) *Attorney, Agent, or Firm*—Finnegan, Henderson, Farabow, Garrett & Dunner, L.L.P.

(57) ABSTRACT

A zoom camera with a focusing error correcting function and a method of controlling the zoom camera includes a controller for selectively performing a focusing error correcting operation based on the moving direction of the lens barrel prior to a release one-step switch being operated. The controller does not perform the focusing error correcting operation if the zooming operation has been carried out in the design base zoom direction. On the other hand, the controller causes the lens barrel to move in the design base zoom direction for a predetermined time to perform the focusing error correcting operation if the zooming operation has been performed such that the lens barrel has moved opposite to the design base zoom direction. Thereafer, the controller actuates the shutter to perform a photographing operation upon a release two-step switch being turned on. Furthermore, the lens barrel is moved or stopped based on the operation of the zoom switch so that it is possible for the user to perform the zooming operation more rapidly with high zooming performance and capture a picture of the subject in a more instantaneous manner.

12 Claims, 5 Drawing Sheets

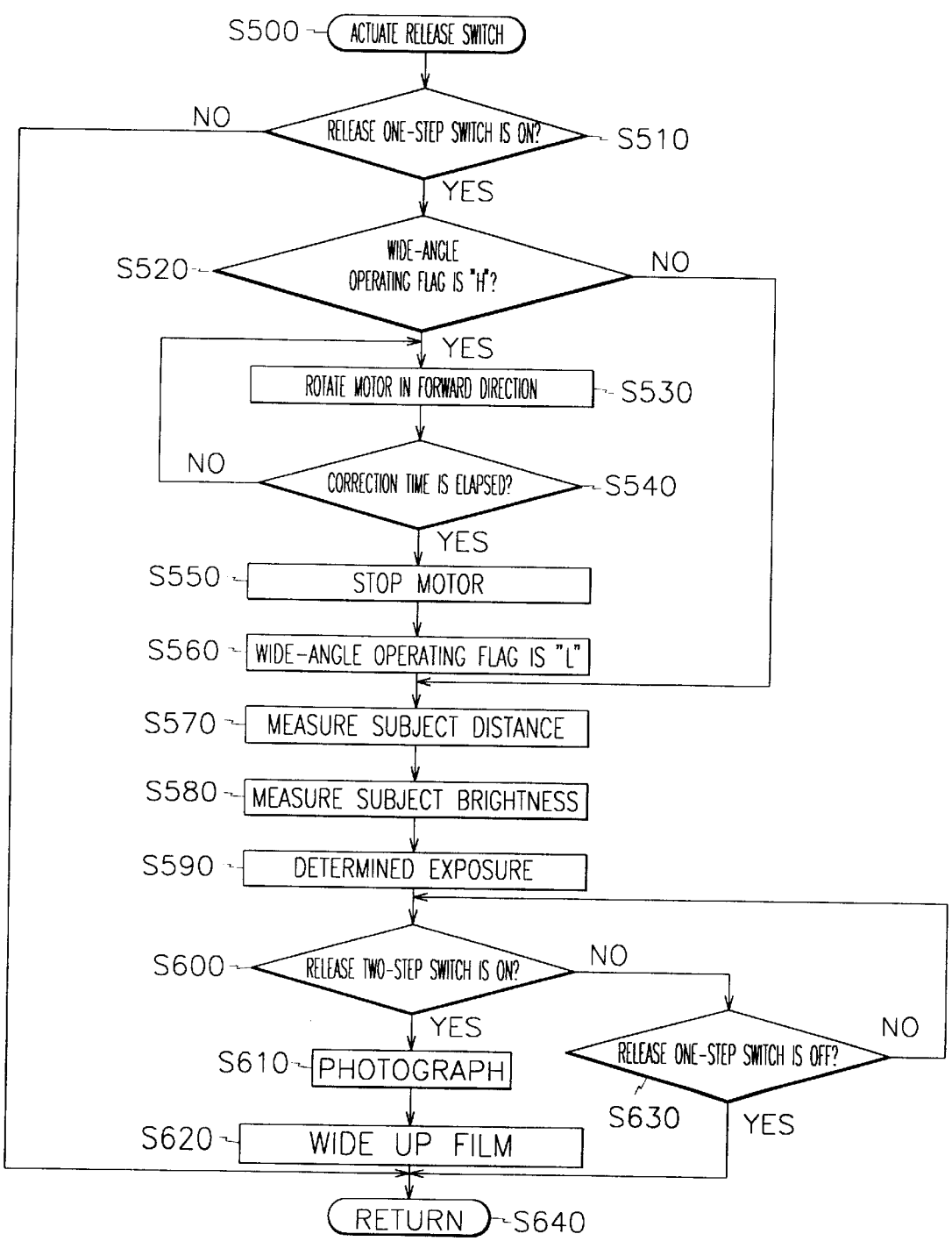

ZOOM CAMERA WITH FOCUSING ERROR CORRECTING FUNCTION AND CONTROL METHOD FOR THE SAME

BACKGROUND OF THE INVENTION (a) Field of the Invention

The present invention relates to a zoom camera with a focusing error correcting function and a control method for such a camera. More specifically, the present invention relates to a zoom camera and a control method in which upon a release switch being turned on, the zoom camera selectively corrects the position of the focal point based on moving direction of a lens barrel prior to release switch being operated.

(b) Description of the Related Art

In general, when taking a picture with a zoom camera, the user actuates a zoom switch to move the lens barrel to a telephoto position (i.e., in a telephoto direction) or to a wide-angle position (i.e., in a wide-angle direction) in order to adjust the magnification of the subject and compose a picture, and then depresses a shutter button to take a picture of the subject. As used herein, the term zoom should be understood as the operation of moving the lens in either the telephoto direction or the wide-angle direction.

When the shutter button is depressed to turn a release one-step switch to an on position (ON), a control system of the camera measures distance and brightness of the subject, and determines an auto focus (AF) step, that is, a displacement of the focus lens of the lens groups based on the measured distance of the subject in order to perform focus adjustment at the current distance of the subject. The control system then determines the desired exposure, that is, the opening rate of the shutter based on the measured distance and brightness of the subject.

Upon a release two-step switch being turned to an on position (ON), the control system moves the focus lens of the lens groups to the predetermined AF step to adjust the focus of the lens and opens the shutter based on the determined exposure in anticipation of photographing. In the zoom camera, however, the subject-distance-based AF is set based on a position for stopping the lens barrel by engagement of gears to move the lens barrel in a design basis direction of the camera. Thus there is a possible focusing error unless the lens barrel is at the design basis position during zooming, even though the focus is adjusted while the release two-step switch is ON.

More specifically, when the lens barrel is moved in reverse to the design base direction during zooming, the position and direction for engagement of the gears are varied and the lens barrel becomes out of place. This results in a focusing error even when focus adjustment is achieved based on the subject distance. The lens is therefore brought out of focus during photographing such that the camera produces an unclear image on the picture due to a focusing error.

SUMMARY OF THE INVENTION

It is an object of the present invention to solve the problem of conventional zoom cameras by providing a zoom camera capable of performing focus adjustment with accuracy in photographing, irrespective of the moving direction of the lens barrel during zooming before a release switch is operated.

To achieve this object, when the release switch is ON, a zoom camera according to an aspect of the present invention selectively performs a focusing error correcting operation based on the moving direction of the lens barrel during zooming. That is, the zoom camera performs the focusing error correcting operation by moving the lens barrel in reverse to, or in the opposite direction of, the zooming direction, if the lens barrel has been moved in reverse to, or in the opposite direction of, the design base zooming direction of the camera during a zooming operation and thus there is a possible focusing error.

In accordance with one aspect of the present invention, a zoom camera with a focusing error correcting function includes: a zoom switch for selecting a zooming operation to move a lens barrel either in a telephoto direction or in a wide-angle direction, a release switch comprising a release one-step switch and a release two-step switch sequentially actuated upon selection of a photographing operation, a distance measurer for measuring the distance of a subject from the camera, a light measurer for measuring the brightness of the subject, a lens barrel mover for moving the lens barrel to a corresponding zoom position during the zooming operation, a zoom position detector for detecting the zoom position of the moving lens barrel and for generating a corresponding lens barrel position signal based on the detected zoom position, a controller for, when the zoom switch is ON, driving the lens barrel mover to perfozooming operation, and, when the release one-step switch is ON, selectively driving the lens barrel mover based on the moving direction of the lens barrel before the release one-step switch is ON, so as to correct a focusing error, determining an exposure based on the measured distance and brightness of the subject, and generating a photographing signal to perform the photographing operation based on the determined exposure, when the release two-step switch is ON. The zoom camera also includes a photographing mechanism for opening a shutter based on the photographing signal to perform the photographing operation.

According to an aspect of the invention in a zoom camera designed to cause engagement of gears to move the lens barrel base in a design base direction including either a telephoto design base direction, i.e., from a wide-angle to a telephoto position, or in a wide-angle design base direction, i.e., from a telephoto position to wide-angle position, the controller controls the lens barrel mover to move the lens barrel in the design base direction for a predetermined time to correct the focusing error, if the lens barrel has been moved in a direction opposite to the design base direction during the zooming operation and the release one-step switch is ON. On the other hand, the controller performs no focusing error correction if the lens barrel has been moved in the design base direction during the zooming operation. Consequently, it is possible to obtain a clear image on the picture without a focusing error irrespective of the zoom moving direction of the lens barrel before the release one-step is turned ON.

During zooming, the controller may control the lens barrel mover to move the lens barrel in the wide-angle direction when the zoom switch is actuated to thereby move the lens barrel from a telephoto position to a wide-angle position, and then may stop the lens barrel from moving in the wide-angle direction upon the zoom switch being turned OFF. Alternatively, the controller may control the lens barrel mover to move the lens barrel in the telephoto direction when the zoom switch is actuated, to thereby move the lens barrel from a wide-angle position to a telephoto position, and then may stop the lens barrel from moving in the telephoto direction upon the zoom switch being turned OFF.

As a result, it may be possible to perform the zooming operation more rapidly with high zooming performance since the zooming operation is started or stopped immediately based on the on/off state of the zoom switch.

In another aspect of the present invention, a method for controlling a zoom camera with a focusing error correcting function includes determining whether a zooming operation is selected and moving a lens barrel either in a telephoto direction or a wide-angle direction, performing the zooming operation to move the lens barrel in the telephoto direction or the wide-angle direction upon selection of the zooming operation with a zoom switch turned ON, after completion of the zooming operation, determining whether a release switch is actuated to start a photographing operation, the release switch comprising a release one-step switch and a release two-step switch. The method further includes, with the release one-step switch ON, selectively performing a focusing error correction based on a moving direction of the lens barrel prior to the release one-step switch being turned on, measuring a distance of a subject from the camera and a brightness of the subject to determine an exposure, and opening a shutter based on the exposure, with the release two-step switch ON.

According to an aspect of the invention; in a method for controlling the zoom camera designed to cause engagement of gears to move the lens barrel in a design base direction including either a telephoto design base direction or a wide-angle design base direction, the performing the focusing error correction causes the lens barrel to move in the design base direction for a predetermined time to correct a focusing error if the lens barrel has been moved in direction opposite to the design base direction during the zooming operation. On the other hand, the focusing error correction is not performed if the lens barrel has been moved in the design base direction during the zooming operation.

According to yet another aspect of the invention, a controller for a zoom camera includes a mechanism for driving a lens barrel mover to move a lens barrel when a zoom switch is on to perform a zooming operation and a mechanism for selectively driving the lens barrel mover based on a moving direction of the lens barrel during the zooming operation to correct a focusing error when a release switch is on. The mechanism for selectively driving the lens barrel mover preferably is configured to drive the lens barrel mover to move the lens barrel in a direction of a design base zoom direction if the lens barrel moved in a direction opposite to the design base zoom direction during the zooming operation. The design base zooming direction preferably is one of a telephoto direction and a wide-angle direction. The mechanism for selectively driving the lens barrel mover preferably also is configured not to move the lens barrel to correct a focusing error if the lens barrel moved in the design base zoom direction during the zooming operation. The mechanism for selectively driving the lens barrel mover preferably drives the lens barrel mover for a predetermined time to move the lens barrel in the design base direction.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 4 is a flow chart showing the entire operation of the zoom camera with a release switch ON in accordance with the embodiment of the present invention.

DETAILED DESCRIPTION OF THE PREFERRED EMBODIMENTS

In the following detailed description, a preferred embodiment of the invention is shown and described to illustrate an aspect of carrying out the invention. As will be realized from the detailed description, the invention is capable of modification in various respects, all without departing from the scope and spirit of the invention. Accordingly, the drawings and description are to be regarded as illustrative in nature, and not restrictive.

Figure 1:
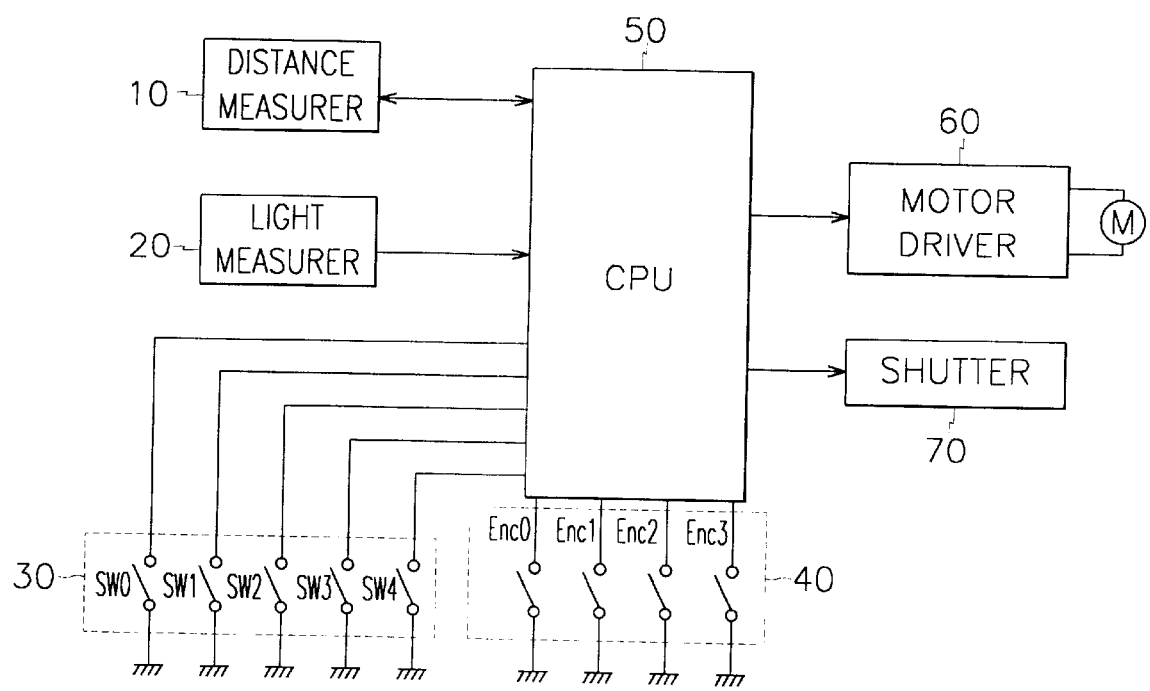
FIG. 1 is a block diagram of a zoom camera with a focusing error correcting function in accordance with an embodiment of the present invention.

FIG. 1 shows a block diagram of a zoom camera with a focusing error correcting function in accordance with an embodiment of the present invention.

As shown in FIG. 1, the zoom camera with a focusing error correcting function includes a distance measurer 10, a light measurer 20, a switch 30, a zoom position detector 40, a controller, preferably in the form of a central processing unit (CPU) 50, connected to the outputs of the distance measurer 10, the light measurer 20, the switch 30, and the zoom position detector 40. A motor driver 60 is connected to the output of the CPU 50. A lens barrel motor M is connected to the output of the motor driver 60 and a shutter 70 is connected to the output of the CPU 50. The distance measurer 10 measures the distance of the subject from the camera, and the light measurer 20 measures the brightness of the subject. The distance measurer 10 and the light measurer 20 are well known in the art and therefore will not be described in detail.

The switch 30 includes a main switch SW0, release switches, i.e., release one-step switch SW1 and release two-step switch SW2, and zoom switches, i.e., wide-angle switch SW3 and telephoto switch SW4. Although not shown in the figure, the switch 30 may further include other functional switches for selecting multiple functions of the camera.

The main switch SW0 is used to supply the power to the respective components of the camera and to set the camera in a standby mode. The release switches SW1 and SW2 operate to start the photographing operation of the camera. When the user depresses a shutter button (not shown) in order to start the photographing process, the release one-step switch SW1 and the release two-step switch SW2 are sequentially actuated in an inter-dependent relationship with the shutter button. The wide-angle switch SW3 moves the lens barrel toward the wide-angle position, and the telephoto switch SW4 moves the lens barrel toward the telephoto position, as necessary.

The zoom position detector 40 detects a closed position of the lens received in the camera and a zoom position of the lens moving either in the telephoto direction or in the wide-angle direction during zooming. In an embodiment of the present invention, the zoom position detector 40 includes an encoder for generating zoom position signals Enc0 to Enc3. Such encoders are well known in the art and therefore will not be described in detail.

When the zoom switch, i.e., wide-angle switch SW3 or telephoto switch SW4 is ON, the CPU 50 outputs a wide-angle signal to control the zooming operation in a direction from a telephoto position to a wide-angle position, or a telephoto signal to control the zooming operation in a direction from a wide-angle position to a telephoto position at the current zoom detected by the zoom position detector 40. The motor driver 60 rotates the lens barrel motor M in a reverse direction, i.e., away from the subject being photographed, based on the wide-angle signal or in a forward direction, i.e., toward the subject being photographed, based on the telephoto signal.

Further, when the release switch SW1 or SW2 is ON, the CPU 50 corrects any existing focusing error based on the moving direction of the lens barrel during zooming, determines an exposure based on the distance and brightness of the subject measured at the distance measurer 10 and the light measurer 20, respectively, and controls the shutter 70 based on the determined exposure in anticipation of photographing.

The shutter 70 comprises a shutter connect to a motor (not shown) to open/close the shutter under the control of the CPU 50 such that a light corresponding to the subject enters the film via a photographing lens. In the present invention, the motor driver 60 and the motor M are used to move the lens barrel and will be together referred to as a lens barrel mover.

In a case where there exists a focusing error in photographing based on the moving direction of the lens barrel during zooming, the zoom camera of the present invention first corrects the focal position, while the release one-step switch is ON, by moving the lens barrel in a reverse direction to the zooming direction. Then, when the release two-step switch is turned ON, the CPU 50 performs focus adjustment based on the subject distance.

More specifically, in a zoom camera designed to cause engagement of the gears to move the lens barrel in a design base direction from a wide-angle position to a telephoto position, moving the lens barrel in the opposite direction, that is, from a telephoto position to a wide-angle position, changes the position and direction for engagement of the gears so as to bring the lens barrel out of place and thus out of focus.

Thus, the zoom camera according to the invention determines whether a possible focusing error exists in performing a zooming operation from a telephoto position to a wide-angle position, and then corrects the focusing error upon the release of the one-step switch SW1 being turned ON by moving the lens barrel to some degree in the telephoto direction, i.e., in reverse to the wide-angle moving direction of the lens barrel that occurred during the zooming operation.

On the other hand, in a zoom camera designed to cause engagement of the gears to move the lens barrel in a base direction from a telephoto position side to a wide-angle position, moving the lens barrel in the opposite direction, that is, from a wide-angle position to the telephoto side changes the position and direction for engagement of the gears so that the actual focal distance of the lens becomes different from the design base focal distance after the lens barrel stops moving.

Thus, the camera determines whether there exists a focusing error as a result of performing a zooming operation in a direction from a wide-angle position to a telephoto position, and then corrects the focusing error upon the release of the one-step switch SW1 being turned ON by moving the lens barrel to some degree in the wide-angle direction, i.e., in reverse to the telephoto moving direction of the lens barrel that occurred during the zooming operation.

Now, a description will be given in further detail as to the operation of the zoom camera with a focusing error correcting function according to an aspect of the present invention with reference to the accompanying FIGS. 2–4.

Figure 2:
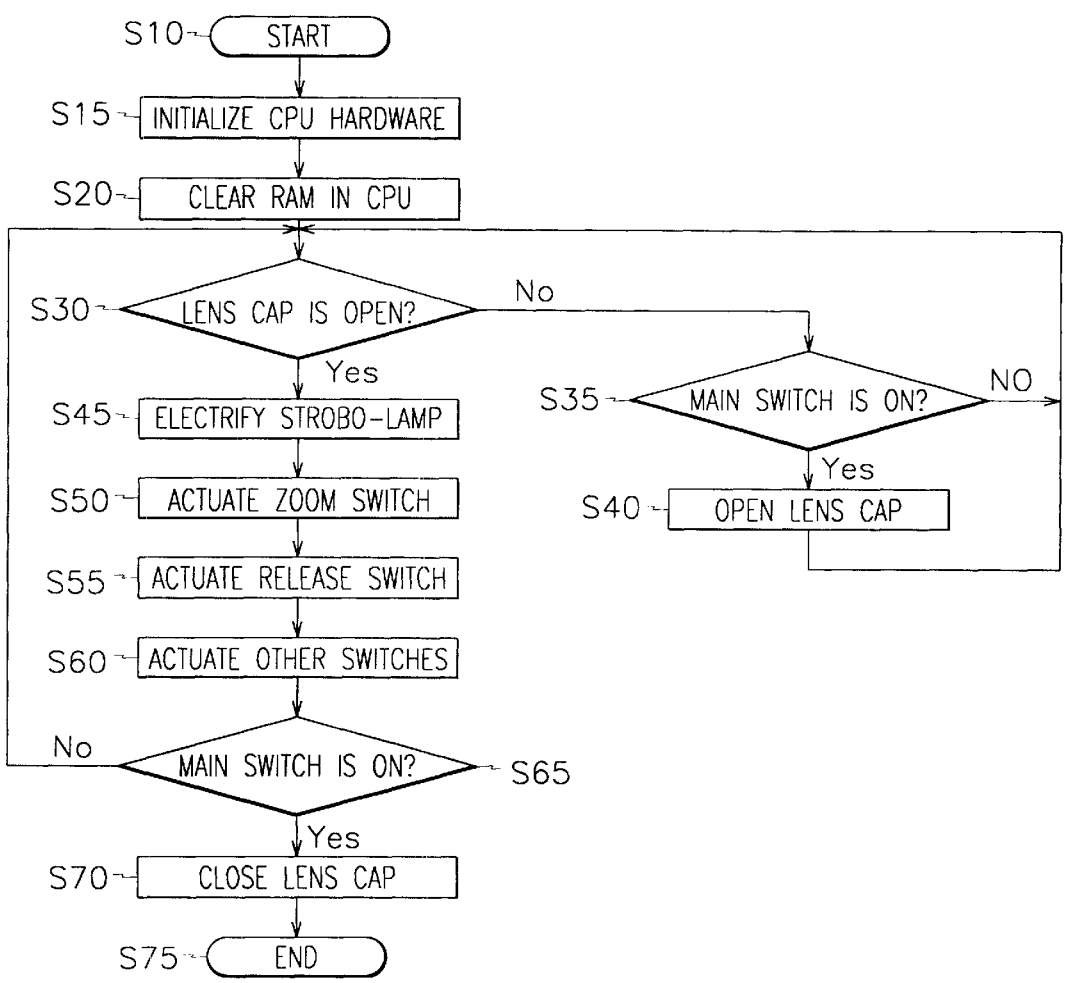
FIG. 2 is a flow chart showing the entire operation of the zoom camera with a focusing error correcting function in accordance with the embodiment of the present invention.
Figure 3A:
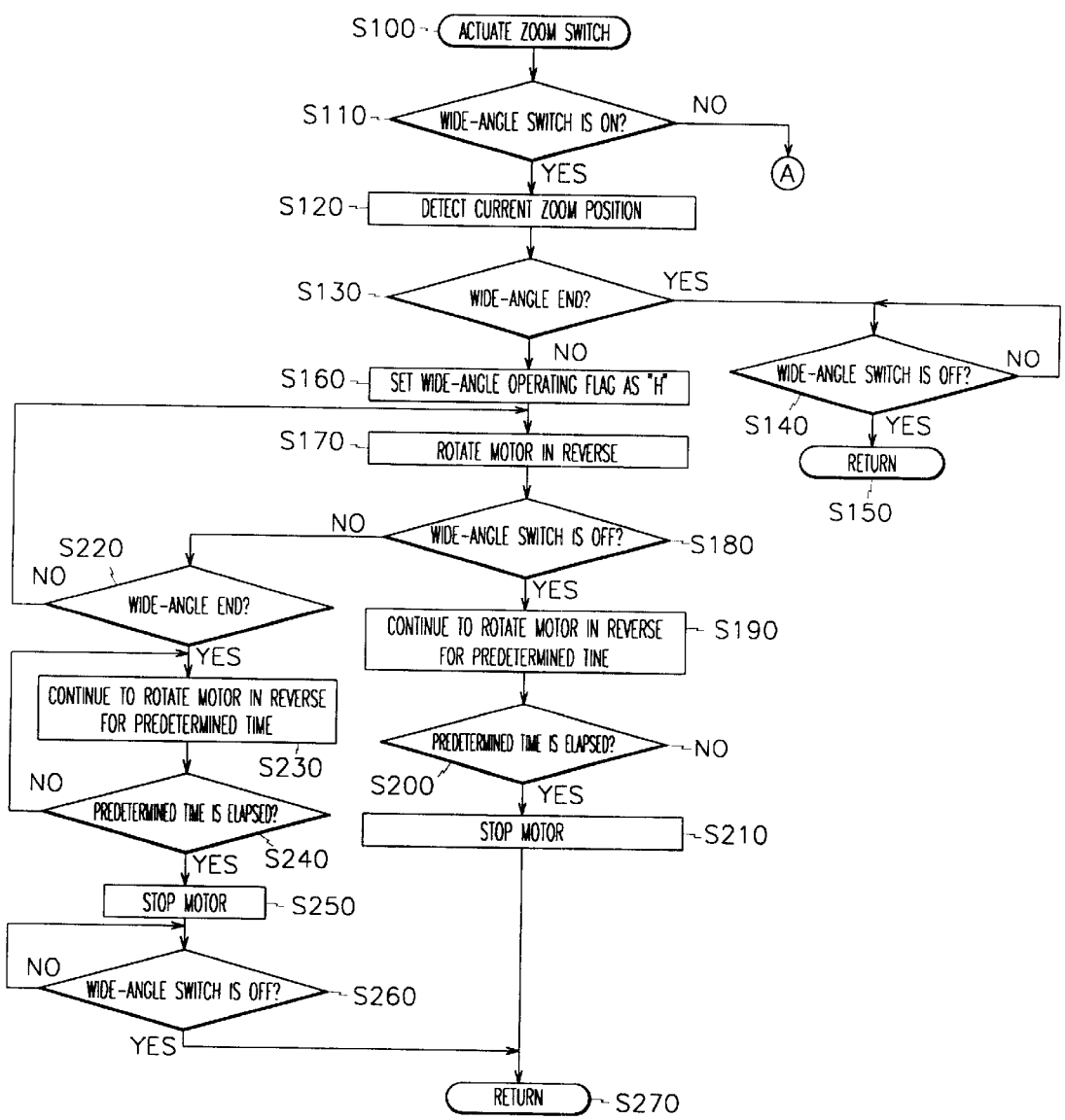
FIG. 3a is a flow chart showing a zooming operation in a direction from a telephoto side to a wide-angle side in accordance with the embodiment of the present invention.
Figure 3B:
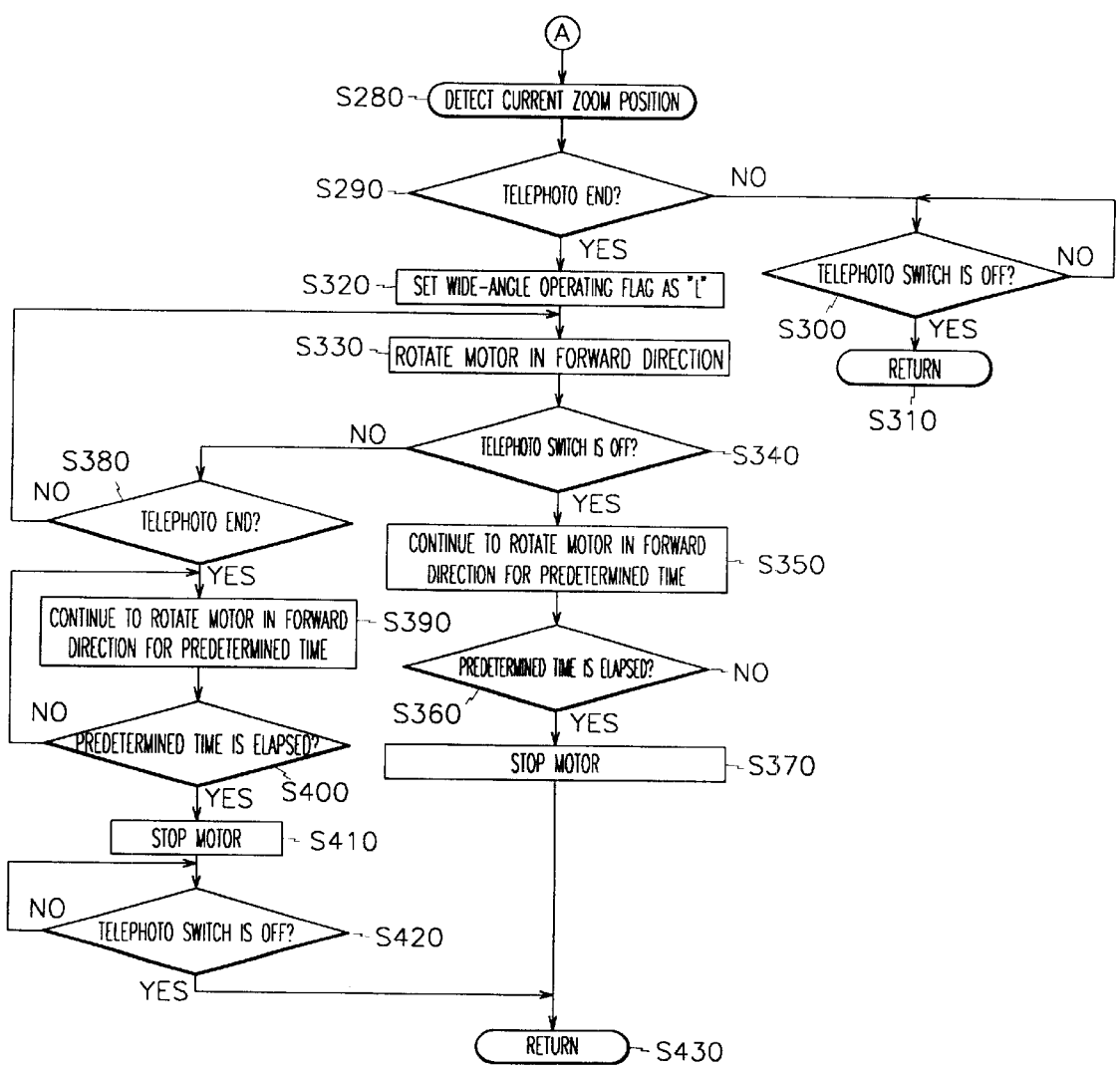
FIG. 3b is a flow chart showing a zooming operation in a direction from the wide-angle side to the telephoto side in accordance with the embodiment of the present invention.

FIG. 2 is a flow chart showing the entire operation of the zoom camera with a focusing error correcting function in accordance with an embodiment of the present invention FIG. 3a is a flow chart showing a zooming operation from a telephoto position to a wide-angle position and FIG. 3b is a flow chart showing a zooming operation from a wide-angle position to a telephoto position. Further, FIG. 4 is a flow chart showing the entire operation of the zoom camera with a release switch ON in accordance with an embodiment of the present invention.

As shown in FIG. 2, when the user operates the main switch SW0 of the camera, the CPU 50 initializes the internal hardware and Random Access Memory (RAM) (not shown) and positions the lens barrel at the wide-angle extreme end position to set the camera in the standby mode, in steps S10 to S20.

It is then determined in step S30 if the lens cap is open. Upon detecting zoom position signals Enc0 to Enc3 output from the zoom position detector 40 indicating that the lens barrel is in the closed position, the CPU 50 determines that the lens cap is closed, and opens the lens cap, in steps S35 to S40. In connection with this, the CPU 50 actuates the motor driver 60 to move the lens barrel to the open position at which photographing is enabled.

If the lens barrel is not in the closed position, the CPU 50 determines that the lens cap is open. When the ambient brightness is not high enough, the CPU 50 electrifies a strobo-lamp emitting a predetermined quantity of light, in step S45. The electrifying operation of the strobo-lamp, is well known in the art and therefore will not be described in detail.

Subsequently, the CPU 50 performs a zooming operation, a release operation, or a setting operation for other multiple functions of the camera based on the operation of the switch 30.

When the user depresses the zoom switch in order to move the lens barrel either toward a wide-angle position or a telephoto position, with the lens cap open, the CPU 50 performs a zooming operation according to the zoom switch processing routine shown in FIG. 3a, in step S50 of FIG. 2.

In the zoom switch processing routine shown in FIG. 3a, when the actuated zoom switch is wide-angle switch SW3, the CPU 50 detects the current zoom position of the lens barrel from the zoom position signals Enc0 to Enc3 received from the zoom position detector40, in steps S100 to S120.

If the current zoom position of the lens barrel is the wide-angle extreme end position, the CPU 50 determines that the lens barrel is impossible to move in the wide-angle direction any further. The CPU 50 waits for the wide-angle switch to be turned OFF and returns to the main routine when the wide-angle switch is turned OFF, in steps S130 to S150.

On the other hand, if the current zoom position of the lens barrel is not the wide-angle extreme end position, the CPU 50 sets a wide-angle operating flag as "H" to indicate the zooming operation is being performed in the wide-angle direction and stores it in the RAM (not shown), in step S160. The CPU 50 then generates a wide-angle signal to move the lens barrel in the wide-angle direction. Based on the wide-angle signal, the motor driver 60 rotates the lens barrel motor M in a reverse direction to move the lens barrel in the wide-angle direction, in step S170.

At this point, the wide-angle operating flag set as "H" indicates that the zooming operation is being performed in the wide-angle direction from the telephoto direction to the wide-angle direction, or as "L" indicating the zooming operation is being performed in a direction from the wide-angle direction to the telephoto direction.

When the lens barrel is moving to a wide-angle position with the wide-angle switch SW3 ON, the CPU 50 determines the on/off state of the wide-angle switch SW3 in step S180. Upon the wide-angle switch SW3 being turned OFF, the CPU 50 stops the lens barrel from moving, determining that the zooming operation has been completed.

That is, when the wide-angle switch SW3 is turned OFF during zooming in a wide-angle direction to the wide-angle side, the CPU 50 generates a wide-angle signal and controls the motor driver 60 to rotate the lens barrel motor M in the reverse direction (i.e., wide-angle direction) for more predetermined time, in step S190. After an elapse of the predetermined time, the CPU 50 preferably generates a telephoto signal instead of the wide-angle signal to suspend the lens barrel motor M temporarily and then interrupts generation of the telephoto signal to completely stop the lens barrel motor M, in step S200 and S210. Alternatively, the CPU 50 may continue to generate the telephoto signal for a longer period of time to rotate the lens barrel motor M in a forward direction so that the lens barrel moves slightly in the telephoto direction before stopping.

If the current zoom position of the lens barrel is not the wide-angle end and the wide-angle switch SW3 is still ON in step S180, the CPU 50 continues to rotate the lens barrel motor M in a reverse direction to move the lens barrel in the wide-angle direction. However, when the current zoom position of the lens barrel is the wide-angle extreme end position and the wide-angle switch SW3 is still ON, the CPU 50 controls the motor driver 60 to stop the lens barrel from moving, in steps S220 to S250. Then, the CPU 50 waits for the wide-angle switch to be turned OFF and returns to the main routine shown in FIG. 2 when the wide-angle switch is turned OFF, in step S260.

On the other hand, if the actuated zoom switch is the telephoto switch SW4, the CPU 50 performs a zooming operation in the telephoto direction according to the routine shown in FIG. 3b. The zooming operation in the telephoto direction is similar to the zooming operation in the wide-angle direction as described above.

More specifically, when the telephoto switch SW4 is ON, the CPU 50 detects the current zoom position of the lens barrel, in step S280. If the current zoom position of the lens barrel is the telephoto end position, the CPU 50 waits for the telephoto switch SW4 to be turned OFF and returns to the main routine when the telephoto switch is OFF, in steps S290 to S310. If the current zoom position of the lens barrel is not the telephoto end position, the CPU 50 sets the wide-angle flag as "L" and rotates the lens barrel motor M in a forward direction to move the lens barrel in the telephoto direction, in steps S320 and S330.

When the telephoto switch SW4 is turned OFF while the lens barrel is moving to a telephoto position, the CPU 50 stops the lens barrel from moving. That is, the CPU 50 preferably continues to generate a telephoto signal and to control the motor driver 60 to rotate the lens barrel motor M in a forward direction for more predetermined time (i.e., in the telephoto direction), in steps S340 and S350. After an elapse of the predetermined time, the CPU 50 preferably generates a wide-angle signal instead of the telephoto signal to suspend the lens barrel motor M temporarily and then preferably interrupts generation of the wide-angle signal to completely stop the lens barrel motor M, in steps S360 and S370. Alternatively, the CPU 50 may generate the wide-angle signal for a longer period of time and rotate the lens barrel motor M in a reverse direction so that the lens barrel moves slightly in the wide-angle direction before stopping.

On the other hand, if the current zoom position of the lens barrel is not the telephoto end position and the telephoto switch SW4 is still ON, the CPU 50 continues to rotate the lens barrel motor M in a forward direction to move the lens barrel in the telephoto direction. However, when the current zoom position of the lens barrel is at the telephoto end position while the telephoto switch SW4 is still ON, the CPU 50 controls the motor driver 60 in a manner similar to that described with reference to the description of FIG. 3A above to stop the moving lens barrel, in steps S380 to S410. The CPU 50 then returns to the main routine shown in FIG. 2 when the telephoto switch SW4 is OFF, in step S420.

As described above, the CPU 50 performs a zooming operation based on the on/off state of the zoom switch and stops the lens barrel when the zoom switch is turned OFF. If the user depresses the shutter button after the zooming operation in order to take a picture of the subject, the release switches are actuated so that the CPU 50 goes to the routine shown in FIG. 4 in anticipation of photographing, in step S550.

As shown in FIG. 4, upon the release one-step switch SW1 being turned ON, the CPU 50 first checks the wide-angle operating flag stored in the RAM (not shown) in order to determine whether a zooming operation has been performed in the wide-angle direction or in the telephoto direction.

If the wide-angle operating flag is set as "H", the CPU 50 determines that the zooming operation has been performed from a telephoto position to a wide-angle position (i.e., in the wide-angle direction) and that there may exist a focusing error during photographing, in steps S510 and S520. In order words, the zoom camera in accordance with the embodiment of the present invention in FIGS. 2–4 is designed to cause engagement of gears to move the lens barrel in a design base direction from a wide-angle position to a telephoto position (i.e., in a telephoto direction), and thus the direction for engagement of the gears is reversed during zooming in the wide-angle direction, i.e., from a telephoto position to a wide-angle position. This makes the lens barrel out of place and thereby causes a focusing error.

To correct the possible focusing error resulting from inaccuracy in the positioning of the lens barrel, the CPU 50 rotates for a predetermined time the lens barrel motor M in reverse to the moving direction of the lens barrel during zooming. That is, in the embodiment of FIGS. 2–4, the CPU 50 causes forward rotation of the motor M to move the lens barrel in the telephoto direction and, after an elapse of predetermined time (stored in a separate memory), stops the motor M, in steps S530 to S550. At this time, the CPU 50 generates a wide-angle signal, instead of the telephoto signal causing forward rotation of the lens barrel motor M, and temporarily stops the motor M. The CPU 50 then interrupts the wide-angle signal to completely stop the motor M.

In accordance with an embodiment of the present invention, the correction time preferably may be varied depending on the type of the components, such as gears, and the like, for example, used to move the lens barrel of the camera, and also may be determined through experimentation so as to correct the focusing error while the release switch is ON. The correction time that is determined preferably is stored in a separate memory such as, for example, EEPROM, or other suitable strong mechanisms.

Following the focusing error correction during the zooming operation in the wide-angle direction, the CPU 50 sets the wide-angle operating flag as "L" and reports the completion of the focusing error correction, in step S560.

On the other hand, if the wide-angle operating flag is set as "L" indicating that a zooming operation has been performed in the telephoto direction before the release switch is turned ON, the CPU 50 does not perform the above-stated focusing error correcting operation, as it is determined that there is no focusing error since the zooming operation caused lens barrel movement in the design base direction.

Subsequently, the CPU 50 actuates the distance measurer 10 to measure the distance of the subject and determine the AF step based on the subject distance, and measures the brightness of the subject based on the signal output from the light measurer 20, in steps S570 and S580. The CPU 50 then determines an exposure (i.e., shutter speed, shutter opening rate, etc) based on the measured distance and brightness of the subject, in step S590. Determination of the exposure is well known in the art and therefore will not be described in detail.

When the release two-step switch SW2 is ON, the CPU 50 drives the motor of the shutter 70 to move the focus lens of the lens groups provided in the lens barrel to the AF step and actuates the shutter of the shutter 70 based on the determined exposure in anticipation of photographing, in steps S600 and S610. Thereafter, in step S620, the CPU 50 winds the film by one exposure.

As described above, when the release one-step switch SW1 is ON, the CPU 50 moves the lens barrel to a correct position and adjusts the focus, so that a clear image can be obtained without any focusing error.

On the other hand, when the release two-step switch SW2 is OFF, the CPU 50 determines whether the release one-step switch SW1 is ON. If the release one-step switch SW1 is OFF, the CPU 50 returns to the main routine in step S630.

After returning to the main routine shown in FIG. 2, the CPU 50 performs a corresponding operation based on the on/off state of another switch other than the release switches and the zoom switch in step S60. With the main switch SWO OFF, the CPU 50 closes the lens cap to ends all operations in steps S65 to S75.

Although the case with a zoom camera designed to cause engagement of the gears to move the lens barrel in a base direction from a wide-angle position to a telephoto position (i.e., in a telephoto direction) has been explained in the above-mentioned embodiment of FIGS. 2–4, it is apparent that the same effect can be achieved with a zoom camera designed to cause engagement of the gears to move the lens barrel design base in a direction from a telephoto position to a wide-angle position (i.e., in a wide angle direction).

In the latter case, the entire operation of the camera, i.e., lens opening, zooming and photographing based on the on/off state of the release switch is essentially the same as in the above-described embodiment, except for the moving direction of the lens barrel during the focusing error correcting operation in photographing. More specifically, when the release switch is turned ON after a zooming operation in a telephoto direction from a wide-angle position to a telephoto position such that the wide-angle flag is set as "L", the lens barrel is moved in the wide-angle direction, i.e., in reverse to the zooming direction, for a predetermined time and stopped in order to correct a possible focusing error. If, on the other hand, it is detected that the wide-angle flag is set as "H," indicating that movement occurred in the wide-angle direction during zooming, no focusing error correcting operation takes place.

It should be to be noted that the invention is intended to cover various modifications and equivalent arrangements included within the spirit and scope of the appended claims.

As will be apparent from the above description, the present invention provides a zoom camera capable of producing a clear image without any focusing error irrespective of the moving direction of the lens barrel during zooming.

In accordance with the present invention, the zoom camera does not perform a focusing error correcting operation when the release switch is ON and the lens barrel has been moved in the same direction as the design base direction of the camera during zooming. As a result, it is possible to reduce time and power required in performing the focusing error correcting operation and thereby enables a more rapid photographing operation.

The present invention also makes it possible to perform a zooming operation more rapidly in a simple way with high zooming performance since the lens barrel may stop immediately when the zoom switch is turned OFF during zooming. Consequently, the user may design a picture of the subject rapidly and capture the subject more instantaneously. It also may be possible to reduce power consumption in the zooming operation. In addition, the present invention may prevent vibrations of the finder since the lens barrel stops immediately upon the zoom switch being turned OFF. This may cause the photographer less eye fatigue when observing the subject via the finder.

What is claimed is:

1. A zoom camera with a focusing error correcting function, comprising:

a zoom switch for selecting a zooming operation to move a lens barrel in one of a telephoto and a wide-angle direction;

a release switch comprising a release one-step switch and a release two-step switch sequentially actuated upon selection of a photographing operation;

a distance measurer for measuring the distance of a subject from the camera;

a light measurer for measuring the brightness of the subject;

a lens barrel mover for moving the lens barrel to a corresponding zoom position during the zooming operation;

a zoom position detector for detecting the zoom position of the lens barrel and for generating a lens barrel position signal based on said detected zoom position;

a controller for, when the zoom switch is on, driving the lens barrel mover to perform the zooming operation, and, when the release one-step switch is on, selectively driving the lens barrel mover based on the moving direction of the lens barrel before the release one-step switch is on, so as to correct a focusing error, determining an exposure based on the measured distance and brightness of the subject, and generating a photographing signal to perform the photographing operation based on the determined exposure when the release two-step switch is on;

and a photographing mechanism for opening a shutter based on the photographing signal to perform the photographing operation.

2. The zoom camera of claim 1, wherein:

the zoom camera is designed to cause engagement of gears to move the lens barrel in a design base direction including one of a telephoto design base direction and a wide-angle design base direction, the controller is configured to control the lens barrel mover to move the lens barrel in the design base direction for a predetermined time to correct the focusing error if the lens barrel has been moved in a direction opposite to the design base direction during the zooming operation and the release one-step switch is on, and the controller is configured to not perform a focusing error correction if the lens barrel has been moved in the design base direction during the zooming operation.

3. The zoom camera as claimed in claim 1, wherein:

the controller is configured to control the lens barrel mover to move the lens barrel in the wide-angle direction when the zoom switch is actuated to move the lens barrel from a telephoto position to a wide-angle position and to stop the lens barrel moving to in the wide-angle direction upon the zoom switch being turned off, and further wherein the controller is configured to control the lens barrel mover to move the lens barrel in the telephoto direction when the zoom switch is actuated to move the lens barrel in from a wide-angle position to a telephoto position, and to stop the lens barrel moving in the telephoto direction upon the zoom switch turned off.

4. A method for controlling a zoom camera, comprising the steps of:

determining whether a zooming operation is selected to move a lens barrel in one of a telephoto direction and a wide-angle direction;

performing the zooming operation to move the lens barrel in the one of the wide-angle direction and the telephoto direction based upon the selection of the zooming operation with a zoom switch turned on;

after completion of the zooming operation, determining whether a release switch is actuated to start a photographing operation, the release switch comprising a release one-step switch and a release two-step switch;

with the release one-step switch on, selectively performing a focusing error correction based on a moving direction of the lens barrel prior to the release one-step switch being turned on;

measuring a distance of a subject from the camera and a brightness of the subject to determine an exposure; and opening a shutter based on the exposure, when the release two-step switch is on.

5. The method of claim 4, wherein:

the zoom camera is designed to cause engagement of gears to move the lens barrel in one of a telephoto design base direction and a wide-angle design base direction and, the performing of focusing error correction causes the lens barrel to move in the design one of the base direction for a predetermined time to correct a focusing error if the lens barrel has been moved in a direction opposite to the one of the design base direction during the zooming operation, and wherein the focusing error correction is not performed if the lens barrel has been moved in the one of the design base direction during the zooming operation.

6. The method of claim 4, wherein the zooming operation step further comprises one of:

stopping the lens barrel moving in the wide-angle direction when the zoom switch is tuned off during the zooming operation in the wide-angle direction; and stopping the lens barrel moving in the telephoto direction when the zoom switch is turned off during the zooming operation in the telephoto direction.

7. A controller for a zoom camera, comprising:

a mechanism for driving a lens barrel mover to move a lens barrel when a zoom switch is on to perform a zooming operation; and a mechanism for selectively driving the lens barrel mover based on a moving direction of the lens barrel during the zooming operation to correct a focusing error when a release switch is on.

8. The controller of claim 7, wherein the mechanism for selectively driving the lens barrel mover is configured to drive the lens barrel mover to move the lens barrel in a direction of a design base zoom direction if the lens barrel moved in a direction opposite to the design base zoom direction during the zooming operation.

9. The controller of claim 8, wherein the design base zoom direction is one of a telephoto direction and a wide-angle direction.

10. The controller of claim 7, wherein the mechanism for selectively driving the lens barrel mover is configured not to move the lens barrel to correct a focusing error if the lens barrel moved in the design base zoom direction during the zooming operation.

11. The controller of claim 10, wherein the design base zoom direction is one of a telephoto direction and a wide-angle direction.

12. The controller of claim 8, wherein the mechanism for selectively driving the lens barrel mover drives the lens barrel mover for a predetermined time to move the lens barrel in the design base direction.

* * * * *

UNITED STATES PATENT AND TRADEMARK OFFICE
CERTIFICATE OF CORRECTION

PATENT NO. : 6,389,230 B1
DATED : May 14, 2002
INVENTOR(S) : Sang-Gi Lee

It is certified that error appears in the above-identified patent and that said Letters Patent is hereby corrected as shown below:

Title page,
Item [57], ABSTRACT,
Line 13, "Thereafer," should read -- Thereafter, --.

Column 12,
Line 18, "tuned off" should read -- turned off --.

Signed and Sealed this

Fourth Day of February, 2003

JAMES E. ROGAN
*Director of the United States Patent and Trademark Office*